United States Patent [19]

Brauer et al.

[11] 4,097,320

[45] Jun. 27, 1978

[54] METHOD OF MANUFACTURING A DOUBLE GLASS PANEL UNIT

[75] Inventors: Harald Otto Christian Brauer; Knud Sejr Jensen; Torben Andreasen, all of Korsor; Hilmer Jensen, Skaelskor; Mogens Greve; Peter Kürstein, both of Korsor, all of Denmark

[73] Assignee: Scanglas A/S, Korsor, Denmark

[21] Appl. No.: 784,908

[22] Filed: Apr. 5, 1977

[30] Foreign Application Priority Data

Apr. 12, 1976 Denmark ............................ 1694/76

[51] Int. Cl.[2] ......................... C03C 27/00; E06B 3/24

[52] U.S. Cl. ..................................... 156/109; 52/304; 52/616; 156/292; 428/34

[58] Field of Search .................. 156/109, 292; 428/34, 428/38; 52/616, 656, 475, 322, 304

[56] References Cited

U.S. PATENT DOCUMENTS

| | | | |
|---|---|---|---|
| 3,424,836 | 1/1969 | McKelvey et al. | 264/251 |
| 3,994,109 | 11/1976 | Pandell | 428/34 |

*Primary Examiner*—David Klein
*Assistant Examiner*—Michael W. Ball

[57] ABSTRACT

A method of manufacturing a multi-glass panel unit with a spacer frame consisting of four straight rails held together by four angular coupling means the arms of which are inserted method including the steps of arranging the rails in spaced relationship, applying an adhesive on side surfaces of the rails, pushing the rails together, mounting the glass panels on the sides of the frame, and pressing sealing material into cavities in the corners of the frame.

3 Claims, 3 Drawing Figures

Fig.1
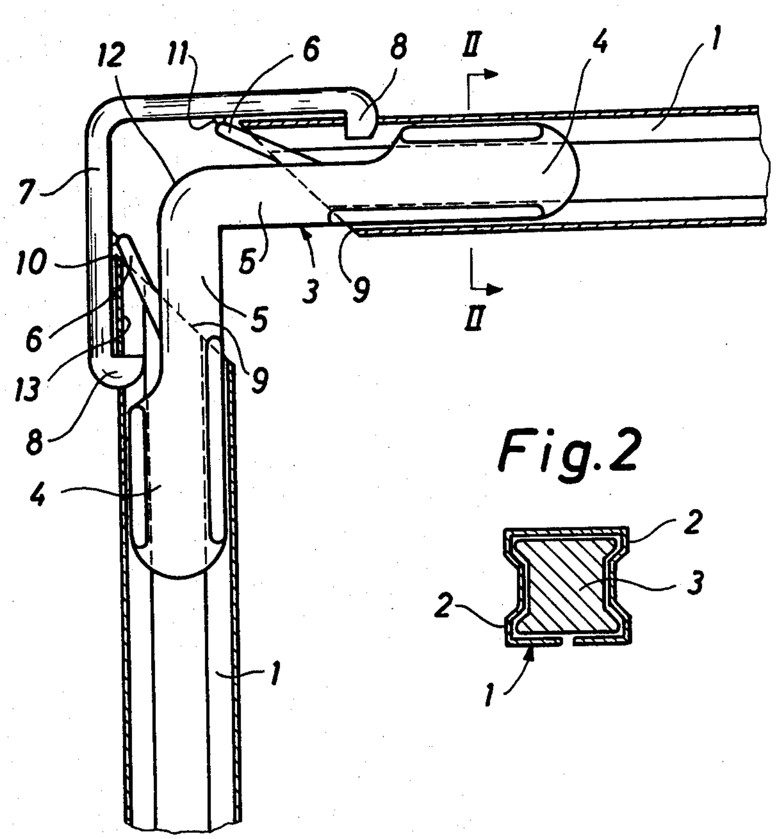
Fig.2
Fig.3
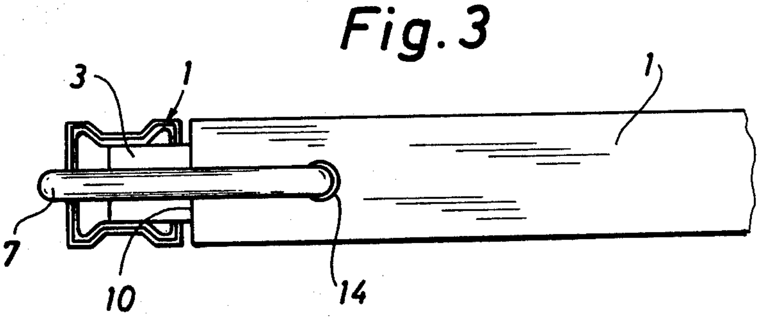

METHOD OF MANUFACTURING A DOUBLE GLASS PANEL UNIT

The invention relates to a method of manufacturing a double glass panel unit having at least two glass panels between which a spacer frame is arranged consisting of straight, rigid rail means with hollow profile, in the ends the rails being mitre cut and joined edge against edge, they being held in position by angular coupling members the arms of which are inserted in the cavities of the rails, seal being provided by injecting sealing material in corner cavities each of which is limited by an outwardly facing surface of the coupling member and the inner walls of the rails, whereas a layer of adhesive is applied to surfaces of the rails facing the glass panels before the latter are mounted on the frame.

A double glass panel unit is known (the Danish patent application No. 6375/74) which is manufactured in the above-mentioned manner. In practice, however, some difficulties have arisen by manufacturing a glass panel unit of the described type by the said method if the process has to be at least partly automatic. It has been used to deliver the adhesive by moving a nozzle in relation to the rails, but it has not been possible to stop the movement in such a way that the strip of adhesive ends exactly at the abutting mitre edges. If the movement is stopped before the exact moment, zones free of adhesive will be provided; if the movement is stopped too late, superfluous adhesive will be piled up in the corners of the spacer frame.

It is the object of the present invention to eliminate these difficulties.

The method according to the invention is characterized in that the rails are arranged and held in a position in which in each corner of the spacer frame a distance is provided between the inclined end surfaces of the rails, and the adhesive is applied to the rails in this position, whereafter the rails are pushed together, so that the inclined surfaces will abut each other before the sealing material after mounting of the glass panels is pressed into the corner cavities.

By this method the supply of the adhesive to the spacer frame is not critical, and the movement of the adhesive nozzle can always be stopped too late, as by this method surplus of adhesive will be applied to the exposed portions of the coupling members where it does not make any harm. After the rails have been pushed together a uniform layer of adhesive will be present on the full lengths of the rails.

By the method according to the invention the spacer frame has to be held in a predetermined position during the supplying of the adhesive. The method according to the invention permits that the coupling members are used for fixing as well as for supporting the rail means during the adhesive supplying operation so that further means causing loss of time and costs will be superfluous.

The invention will now be described by way of an example with reference to the accompanying drawing, in which FIG. 1 is a plane view of a corner of a spacer frame, FIG. 2 is a cross-section along the line II—II in FIG. 1 and FIG. 3 is the same as FIG. 1 seen from above.

A spacer frame for mounting between two glass panels of a multi-glass panel unit is built up of four straight rails 1 which may be manufactured by bending a metal plate and have a hollow profile, as shown in FIG. 2. Each rail has some surfaces 2 which in the assembled state of the window abut the glass panels and have a layer of adhesive serving to keep the window parts together.

On assembling the window the rails 1 are arranged perpendicularly to each other, so that a rectangular frame is provided, and in each corner of the frame a coupling member 3 is inserted. The coupling member 3 may be moulded of plastics material and is angular. The end portions 4 of the arms have a cross-section corresponding to the inner cross-section of the rails 1. The intermediate portions 5 of the coupling member have a less thickness than the end portions 4. On the connecting member 3 a strap 7 which is also angular and which extends parallel to the coupling member 3 is mounted by means of inclined stays 6. In each end the strap 7 has an inwardly facing hook 8 which engages a hole in the outwardly facing surface of the rail 1. By the described means the four rails 1 and the four coupling members 3 are relatively fixed for constituting a stable frame.

The said frame may be supported by means of the straps 7, as not shown suspending means may engage the straps 7, and in the hanging position of the frame an adhesive may be applied to some of the surfaces 2. The adhesive supplying operation may be carried out automatically by means of nozzles which are moved in relation to the rails 1, and the movement may be continued beyond the inclined edges 9, so that excess of adhesive will be supplied to the intermediate portions 5, and it is now certain that adhesive is applied to the full lengths of the surfaces 2.

When the adhesive supplying operation is ended the rail means 1 are pushed together, so that their inclined end surfaces 9 are pushed towards each other. During this movement the front edge 10 of the outward surface will act as a knife which cuts off the strap 7 from the stays 6, so that the strap may be removed. The cutting off may be facilitated if the connection between the strap 7 and the stays 6 consists of weakened portions 11.

When the two inclined surfaces 9 abut each other a cavity is constituted in each corner of the spacer frame, said cavities being limited by the outer surface 12 of the intermediate portions 5 of the coupling member 3 and the inner surface 13 of the outer wall of the rails together with the two glass panels mounted on the sides of the frame. Into these cavities sealing material is pressed through one of the holes 14 in which the hooks 8 have been mounted, and thereby complete tightness is provided between the cavities in the rail means 1 outside the coupling members 3 and the outer atmosphere.

We claim:

1. A method of manufacturing a double glass panel unit having at least two glass panels between which a spacer frame is arranged consisting of straight, rigid rail means having a hollow profile, the rail means being mitre cut at their ends and joined edge against edge and held in position by angular coupling members, the arms of which are inserted in the cavities of the rails, and a seal being provided by injecting sealing material in corner cavities, each of which is limited by an outwardly facing surface of the coupling member and the inner walls of the rail means, wherein a layer of adhesive is applied to surfaces of the rail means facing the glass panels before the latter are mounted on the frame, said rail means being arranged and held in a position in which in each corner of the spacer frame a distance is provided between the inclined end surfaces of the rail means by the use of a coupling member having a strap adapted to engage holes in the rail means when the rail means are in spaced relationship, and the adhesive is applied to the rail means in this position, whereafter the rail means are pushed together so that the inclined surfaces will abut each other before the sealing material after mounting of the glass panels is pressed into the corner cavities, said strap being torn off after the adhesive supplying operation.

2. A method according to claim 1, wherein a strap is used which is angular shaped, the two arms of which extend along and beyond the intermediate portions of the coupling member, and hook means are provided at the ends of the strap adapted to engage holes in the outwardly facing walls of the rail means, each strap being connected to the coupling member by means of stays adapted to be torn off.

3. A method according to claim 2, wherein the stays extend obliquely from the strap towards the ends of the coupling member and are connected to the strap by means of weakened portions, so that the said portions will be cut off by edges of the rail means when the latter are pushed together.

* * * * *